Figure 1:
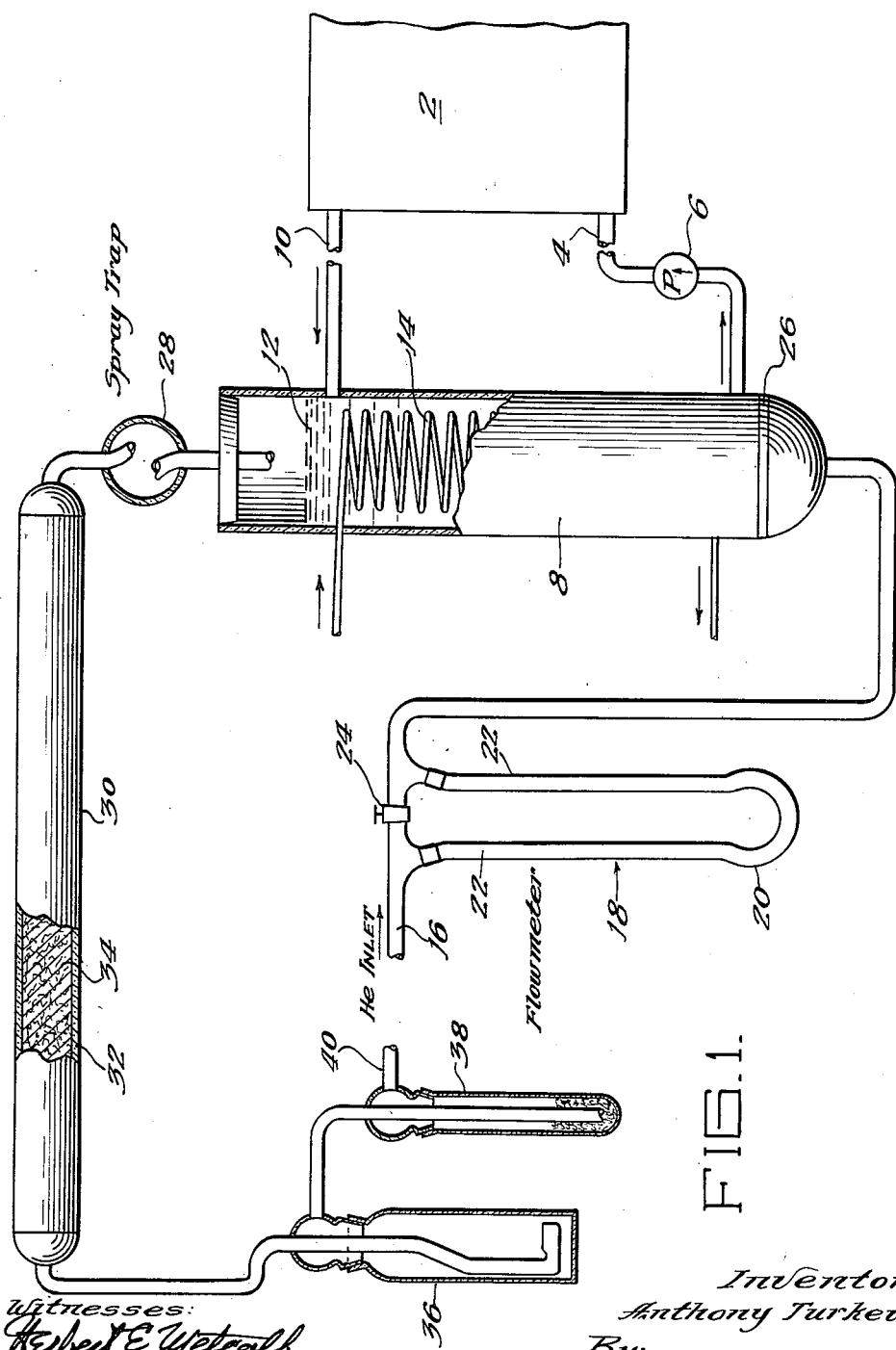

Jan. 22, 1963   A. TURKEVICH   3,074,868
METHOD OF OPERATING A NEUTRONIC REACTOR
Filed May 12, 1945   2 Sheets-Sheet 1

Inventor:
Anthony Turkevich
By: Robert Ascarunz
Attorney

Jan. 22, 1963  A. TURKEVICH  3,074,868
METHOD OF OPERATING A NEUTRONIC REACTOR
Filed May 12, 1945  2 Sheets-Sheet 2

Witnesses:
Herbert E. Metcalf
Walter L. Schlegel, Jr.

Inventor:
Anthony Turkevich
By: Robert A. Lavender
Attorney

United States Patent Office 3,074,868
Patented Jan. 22, 1963

3,074,868
METHOD OF OPERATING A NEUTRONIC REACTOR
Anthony Turkevich, Chicago, Ill., assignor to the United States of America as represented by the United States Atomic Energy Commission
Filed May 12, 1945, Ser. No. 593,509
1 Claim. (Cl. 204—154.2)

This invention relates to the general subject of nuclear fission, and more particularly to a novel method and means for bombardment of fissionable materials.

It is known that certain materials such as $U^{233}$, $U^{235}$ or $94^{239}$, when subjected to neutron bombardment by slow or thermal neutrons, fission or split to yield fragments of lower atomic number. These fragments which have atomic numbers ranging from about 77 to about 158, and, since they are radioactive, the fragments decay into other materials, generally by emission of beta particles. The fragments and the decay products are known as fission products, a majority of which comprise a light group of atomic numbers about 35 to 46 and a heavy group of atomic numbers about 51 to 60.

After substantial bombardment has occurred usual practice has required interruption of the bombardment for treatment of the fissionable composition to remove the fission products and other products of the reaction (including element 94). Removal of fission products is generally regarded as important because of the objectionable radioactivity acquired by the mass undergoing bombardment and also because certain of the fission products, particularly a xenon isotope, has an objectionably high neutron absorption cross-section.

A particularly effective method of establishing neutron bombardment as herein contemplated involves the establishment of a self-sustaining neutron chain reaction in a neutronic reactor. In neutronic reactors a neutron fissionable isotope such as $U^{233}$, $U^{235}$ or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Specific details of the theory and essential characteristics of such reactors are set forth in co-pending application of Enrico Fermi and Leo Szilard, Serial No. 568,904, filed December 19, 1944, now Patent No. 2,708,656, issued May 17, 1955.

The removal of fission products from neutron chain reacting compositions in such reactors is particularly desirable since the absorption of neutrons by fission products such as $xenon^{135}$ becomes very substantial within a few hours and substantially limits the rate at which the reaction may proceed.

In accordance with the present invention it has been found that fission products may be removed to a substantial degree from a fissionable composition during neutron bombardment. This may be accomplished by subjecting to bombardment a liquid fissionable material-moderator composition and removing valuable fission products from the composition.

Thus a neutron chain reaction may be established in a suspension of a fissionable isotope in a liquid moderator and the fission products produced swept out by bubbling gas through the reacting liquid suspension or the liquid suspension may be removed from the reaction zone treated to remove gaseous fission products and returned to the reaction zone. The process may be applied to any liquid suspension including a slurry of natural uranium oxide or carbide in $D_2O$ or a solution or slurry of a uranium compound, such as, uranyl sulphate, uranyl nitrate, $UO_2$ etc. containing more than natural concentrations of $U^{235}$ in ordinary water or $D_2O$.

In a reactor of the above described type operating continuously at high neutron densities, radioactive elements of extremely high capture cross-section may be formed as intermediate elements in the decay chains of the fission fragments, thereby causing significant fluctuations in the reproduction ratio of the reactor. One of the most important of these decay chains is believed to be the 135 fission chain starting with Te (short)→I (6.7 hr.)→Xe (9.2 hr.)→Cs (long lived)→Ba (stable), the parenthetical times indicating half-lives. The neutron absorption of tellurium, iodine, caesium, and barium is relatively unimportant; however, the neutron capture cross-section of radioactive xenon has been measured to about $$3,500,000 \times 10^{-24}$$

cm.$^2$, many times larger than that of stable gadolnium, for example, the cross-section of which is $30,000 \times 10^{-24}$ cm.$^2$. Upon adsorption of a neutron, $xenon^{135}$ shifts to $xenon^{136}$, an element of relatively small capture cross-section. The above mentioned fluctuations in the reproduction ratio of the reactor correspond in period to the appearance and decay of $xenon^{135}$.

The rate of production of the initiating fragment is a function of the neutron density to which the uranium-containing material is exposed, and is, therefore, dependent upon the power at which the reactor is operating. The radioactive $xenon^{135}$ is produced with a noticeable effect on the reaction a few hours after the reaction is started, and this effect becomes greater as the neutron density is increased and maintained.

When the chain reaction has been initiated and the neutron density within the reactor has been stabilized at a predetermined value by the use of neutron absorbent control rods, or by varying the volume of slurry or other suspension within the reactor tank, or by any other desired means, the neutron density drops due to the formation of more and more radioactive iodine which decays into $xenon^{135}$. When $xenon^{135}$ is formed in sufficient quantities to reduce the reproduction ratio below unity by absorption of neutrons, the neutrons reaction stops if no compensation is made for this condition.

According to the present invention, however, this problem has been solved by continuously sweeping such poisoning gases, as $xenon^{135}$, from the slurry, or other suspensions thereby minimizing the effect of this difficulty.

Figure 2:
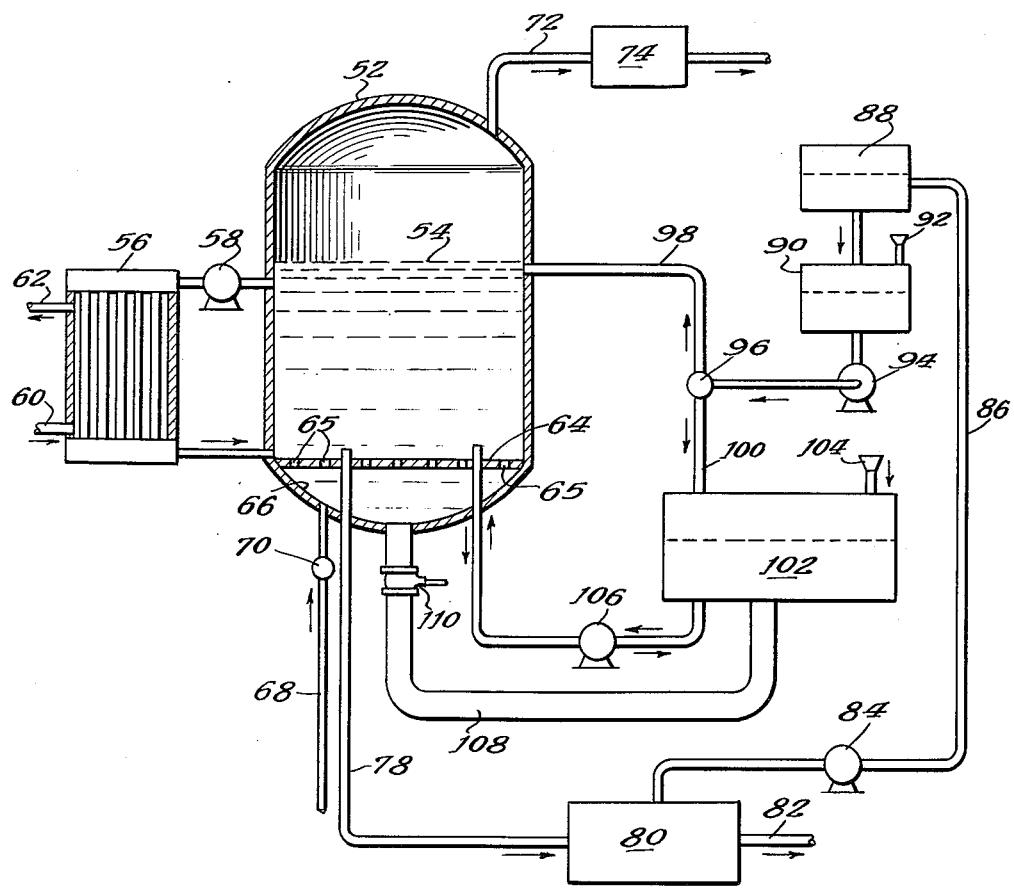

Accomplishment of the foregoing constitute some of the principal objects, features and advantages of the invention, others of which will become apparent when considered in view of the following description and the accompanying drawings wherein:

FIG. 1 is a diagram illustrating a suitable embodiment of the invention, the reactor tank being greatly reduced in size; and FIG. 2 is a diagram illustrating a modification of the invention.

Referring to FIG. 1 a neutronic reactor is diagrammatically illustrated at 2. Inlet pipe 4 of the reactor is connected to the discharge side of pump 6, the suction side of which is connected to a heat exchange and purification tank 8 which in turn is connected to the outlet pipe 10 of the reactor tank 2.

The suspension which is indicated at 12 is circulated through the tanks 2 and 8 by the pump 6, and is cooled within the tank 8 by a coil 14 through which cooling fluid, such as ordinary water, is circulated by any conventional means such as a pump (not shown).

Poisoning or neutron absorbent gases in the slurry within the heat exchange tank 8 are swept therefrom by a gas, such as helium, having a low danger coefficient, the helium being pumped through an inlet pipe 16 having a flow meter generally designated 18 consisting of a mercury filled manometer tube 20, the spaced arms 22, 22 of which are connected to the pipe 16 with a restriction valve 24 disposed intermediate the junction of the respective arms 22, 22 with the pipe 16. By observation of the mercury within a manometer tube which is preferably constructed of glass, the pressure and hence the flow rate of the helium in the pipe 16 may be determined.

As the helium or other gas enters the heat exchange tank 8, it passes through a screen or baffle 26 which diffuses the helium into small bubbles before it passes through the suspension. The helium and the poisoning gaseous fission products which are swept from the suspension collect at the top of the tank 8 and pass through a spray trap 28 into a trap 30 comprising a lead sheath 32 containing any suitable material, such as glass wool 34, which collects the decay products of the short-lived gaseous fission products. The helium and the long-lived gaseous fission products then pass through a sulfuric acid drying cell 36 into a charcoal trap 38 wherein the long-lived gaseous fission products are absorbed by the charcoal and decay there. The helium then passes from the trap 38 through the outlet pipe 40 to a suitable reservoir (not shown). Thus, the gaseous fission products within the slurry are continuously swept therefrom, thereby substantially decreasing the above mentioned poisoning phenomena due to the presence in the slurry of gaseous fission products such as xenon$^{135}$ having relatively greater neutron capture cross-sections.

The decay products may be recovered, if desired, from traps 30 and 38 by conventional processes.

Referring now to FIG. 2, a modification of the invention is illustrated wherein the reactor tank or chamber 52 contains a body of fissionable suspension 54 which is circulated through a heat exchanger 56 by a pump 58. About 6 metric tons of uranium oxide ($UO_2$) and 30 to 40 metric tons of $D_2O$ is required to establish a neutron reaction in such a tank. Cooling fluid, such as water, is circulated through the heat exchanger by means of inlet and outlet pipes 60 and 62, respectively.

A screen or baffle is provided within the reactor tank in the form of an aluminum plate 64 with a plurality of ports 65, 65 therethrough, and helium gas under pressure is admitted to the bottom 66 of the reactor, through an inlet line 68 having a control valve 70 therein. The helium is forced under pressure through the valve 70, and passes through the ports 65, 65 in the screen which thus diffuses the helium into fine bubbles. The bubbles are distributed substantially homogeneously through the slurry and pass upwardly therethrough sweeping gaseous fission products therefrom; and these products along with the helium are conducted from the top of the reactor tank 52 by an outlet line 72 which passes through a trap 74, said trap having conventional means therein for absorbing the gaseous fission products and collecting their decay products. The outlet line 72 may, if desired, be connected to any convenient means such as a pump (not shown) for evacuating the helium from the top of the reactor tank 52.

Small quantities of the suspension are continuously withdrawn from the tank 52 through an outlet pipe 78 which conveys the slurry to a device 80 for separating the moderator fluid from the uranium-containing solids. The uranium-containing solids are withdrawn from the device 80 through the pipe 82 whereupon the elements 93, 94 and the fission products may be separated from one another. The moderator fluid is pumped from the device 80 by a pump 84 through a pipe 86 to a purification tank 88 from which the moderator fluid passes to a supply tank 90 which is also connected by line 92 to a supply source (not shown). The moderator fluid is urged by pump 94 through a three-way valve 96 either into the line 98 communicating with the tank 52 or into line 100 communicating with reservoir 102 into which additional uranium-containing material may be introduced through the supply line 104. The suspension is pumped through the reservoir 102 and the reactor tank 52 by a reversible delivery pump 106.

By means of the apparatus above described, the volume of suspension as well as the concentration of uranium-containing materials within the slurry may be controlled.

An emergency dump line 108 is also provided, said line communicating with the reservoir 102 and through a dump valve 110 with the reactor tank 52. The valve 110 may be opened under emergency conditions to permit rapid flow of the slurry from the reactor tank to the reservoir 102, thereby reducing the body of slurry within the reactor tank below the critical size at which a chain reaction may be sustained.

The invention is capable of numerous variations. For example, gases other than helium such as deuterium, as well as nitrogen, methane, argon, xenon other than xenon$^{135}$, or similar gas may be used in lieu of helium. Moreover, the fissionable suspension may be sprayed into a gas space in a column and collected at the bottom thereof to remove gaseous fission products as herein contemplated. Alternatively the liquid may be allowed to flow over a surface in a thin film preferably while passing another gas over the film in order to strip the gases from the liquid. Furthermore, in neutronic reactors utilizing a liquid reactive composition and operated at high power outputs, the liquid moderator, such as water, light or heavy, dissociates or decomposes under the influence of the various radiations and fission fragment bombardment. These dissociation gases, in being released from the reactive composition, can be sufficient to carry with them all or part of the neutron absorbent gases and perform the function of stripping the unwanted gases from the liquid. Thus deliberate introduction of helium or the like can be eliminated or greatly reduced.

Natural uranium compounds, or compounds containing $U^{233}$ or $94^{239}$ in lieu of $U^{235}$ or enriched compositions containing more than natural concentrations of these isotopes may be used as herein contemplated. These compositions may be suspended or dissolved in the liquid moderator.

It is also to be noted that while the invention has been described for use in removing neutron absorbent gases from the reacting composition, the means and method described and claimed herein are also useful for removing all gaseous phases of the many decay chains initiated in the fission fragments. Removal of the radioactive material while in a gaseous phase greatly reduces the overall radioactivity of the composition and facilitates handling thereof at all times. It will be understood that substantially 100 percent of all gaseous substances, for example, xenon and krypton are swept from the reacting composition. Thus all the gaseous radioactive elements are withdrawn from the reactor thereby reducing the overall radioactivity of the reacting composition. For example, the following table lists the percentages of various activities which in their gaseous phases have been experimentally swept from the reacting composition in accordance with the above described process.

| Activity identified | Percent swept out |
|---|---|
| Ba (12.5 days) + La (40 hrs.) | 20.6 |
| Sr (55 days) | 97.5 |
| Sr (30 years) + Y (60 hrs.) | 3.4 |
| Ce (28 days) | 0.38 |
| Ce (340 days) + Pr (17 min.) | .0125 |
| Zr (65 days) | .073 |
| Y (57 days) | 13.3 |

Although the present invention has been described with particular reference to the specific details of certain embodiments thereof it is not intended that such details shall be regarded as limitations upon the scope of the invention except insofar as included in the accompanying claim.

What is claimed is:

In the method of operating a self-sustaining neutronic reactor comprising subjecting to neutron bombardment a fluid composition consisting of a suspension of approximately six metric tons of uranium oxide in thirty to forty metric tons of $D_2O$, the step of continuously passing deuterium through the fluid composition thereby sweeping from the fluid composition gaseous fission products resulting from the nuclear reaction and separating the deuterium from said gaseous fission products.

References Cited in the file of this patent

UNITED STATES PATENTS

| 1,725,925 | Kent | Aug. 27, 1929 |
| 1,749,561 | Cadman | Mar. 4, 1930 |
| 1,756,018 | Dubbs | Apr. 29, 1930 |
| 1,916,922 | Dow | July 4, 1933 |
| 2,050,025 | Sullivan et al. | Aug. 4, 1936 |
| 2,708,656 | Fermi et al. | May 17, 1955 |

FOREIGN PATENTS

| 314,427 | Great Britain | Dec. 1, 1930 |
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

A.E.C.D.–3063 U.S. Atomic Energy Comm., Water Boiler, September 4, 1944, pp. 1–32. Available from A.E.C. Technical Information Service, Oak Ridge, Tenn.

Kelly et al.: Physical Review 73, 1135–9 (1948). Copy in Patent Office Library.